UNITED STATES PATENT OFFICE.

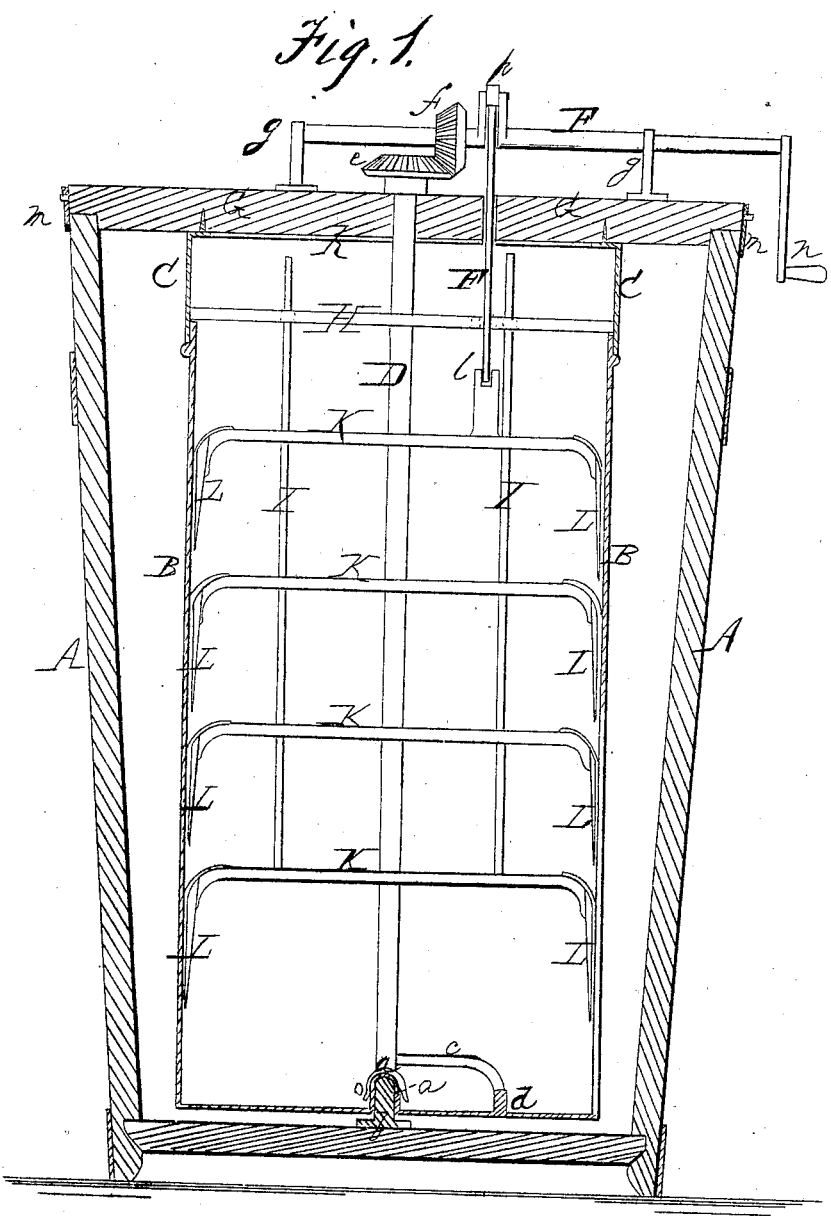

FRANZ G. SIEMERS, OF WINONA, MINNESOTA.

Letters Patent No. 73,658, dated January 21, 1868.

IMPROVED ICE-CREAM FREEZER.

*The Schedule referred to in these Letters Patent and making part of the same.*

TO ALL WHOM IT MAY CONCERN:

Be it known that I, FRANZ G. SIEMERS, of Winona, in the county of Winona, and State of Minnesota, have invented certain new and useful Improvements in Ice-Cream Freezers; and I do hereby declare that the following is a full, clear, and exact description thereof, reference being had to the accompanying drawings, making part of this specification, and to the letters of reference marked thereon, like letters indicating like parts, wherever they occur.

To enable others skilled in the art to construct and use my invention, I will proceed to describe it.

My invention relates to ice-cream freezers, and consists in a novel arrangement of mechanism for agitating, beating, and stirring the cream while being frozen. The drawing—

Figure 1, represents a cross vertical section of my freezer, and shows all of its working parts and manner of construction.

In constructing my freezer, I make a suitable tub, A, of any size desired, and on the upper and inner side of its bottom, and at its centre, fasten an upright pivot, $b$. On the top of the tub A, I place a strong cross-bar, G, letting it into the upper rim of the tub, so as to be flush with its upper edge, and fitting it in easily, so that it may be removed when desired, and holding it in place by means of two hooks $m$, as shown in the drawing. Within the tub A, I place the freezer or receptacle of the cream B, the under or bottom side of which I provide with a socket or thimble, $a$, of just sufficient size to fit upon the pivot $b$, and of the proper length to prevent the bottom of the freezer B coming in contact with the bottom of the tub A. The cover C of the freezer B, I fasten to the cross-bar G, and make it large enough to allow the freezer to turn easily in it. The top $h$ of the cover C may be made of glass, so that the process of freezing may be watched by the operator. In the centre of the freezer B, I place a shaft, D, having its lower end provided with a socket, $o$, of the proper size to fit and turn easily upon the thimble $a$, and being long enough for its opposite end to pass through the cross-bar G and receive a bevel-gear wheel, $e$. Near the lower end of the shaft D, I attach an arm, $c$, bent so that its extreme end may come in contact with a knob, $d$, projecting from the bottom of the freezer B. Across the upper end of the freezer B, I place a cross-bar, H, through which the shaft D passes loosely, and within it a series of cross-bars K, equidistant from one another, and having concaved scoops, L, at their ends, curved so that their extreme ends may scrape the sides of the freezer. These cross-bars K, I connect by two upright rods I, the upper ends of which pass loosely through the cross-bar H, and they are also made so as to move easily upon the shaft D. On the upper side of the cross-bar G, I place a crank-shaft, E, with its bearings in two uprights, $g$, and provided with a bevel-pinion, $f$, which gears into the bevel-gear wheel $e$, and also with double crank $p$ and crank-handle $n$. The double crank $p$, I connect with the cross-bars K by means of the pitman F at $l$, as clearly shown in the drawing.

In operating my ice-cream freezer, I fill it with cream and place it within the tub A, and surround it with ice in the usual way, then put on the cross-bar G, with the cover C attached, and connect the pitman F, (though they may all be put in together,) and turn the crank-handle $n$. As it turns, the shaft D will revolve, and the bent arm $c$, coming in contact with the knob $d$, cause the freezer B to revolve. At the same time the pitman F will cause a vertical motion of the cross-bars K and the scrapers or concave scoops attached to their ends. As the cream freezes first next to the freezer, the scoops or scrapers will thus constantly scrape it off and crowd it towards the centre, and thus continually agitate, beat, and stir it, so that it will be frozen with the greatest evenness throughout. When the cream is frozen, the cross-bar G, cover C, shaft D, and cross-bars K may all be removed at the same time, and access had to the cream thus frozen.

Having thus described my invention, what I claim is—

1. An ice-cream freezer, provided with vertically-moving concave scrapers, arranged to operate substantially as described and for the purpose set forth.

2. The combination of the rotating case B and vertically-moving concave scrapers L, when constructed and arranged to operate substantially as described.

3. The rotating case B, provided with the socket $o$ and the locking-stud $d$, constructed and arranged to operate as set forth.

FRANZ G. SIEMERS.

Witnesses:
    E. S. YOUMARZ,
    G. W. BUSWELL.